United States Patent

Morimoto et al.

[11] Patent Number: 5,658,521
[45] Date of Patent: Aug. 19, 1997

[54] FOAM SHEET, METHOD AND APPARATUS FOR WIDENING FOAM SHEET

[75] Inventors: Naoyuki Morimoto, Hasuda; Ken Takahashi, Kazo; Takeo Takahashi, Saitama-ken, all of Japan

[73] Assignee: Sekisui Kagaku Kogyo Kabushiki Kaisha, Osaka, Japan

[21] Appl. No.: 498,361

[22] Filed: Jul. 5, 1995

Related U.S. Application Data

[63] Continuation of Ser. No. 197,971, Feb. 8, 1994, abandoned.

[30] Foreign Application Priority Data

| Feb. 12, 1993 | [JP] | Japan | 5-023993 |
| May 14, 1993 | [JP] | Japan | 5-113307 |
| Sep. 9, 1993 | [JP] | Japan | 5-224503 |

[51] Int. Cl.⁶ .................................................. B29C 55/00
[52] U.S. Cl. .................. 264/290.2; 264/46.1; 264/210.1; 264/288.4; 264/288.8; 264/291
[58] Field of Search ........................ 264/290.2, 46.1, 264/40.2, 210.1, 288.4, 288.8, 291

[56] References Cited

U.S. PATENT DOCUMENTS

| 3,106,761 | 10/1963 | Mohring et al. |
| 3,923,293 | 12/1975 | Wiegrand ............................ 267/94 |
| 5,087,185 | 2/1992 | Yada et al. |

FOREIGN PATENT DOCUMENTS

94482  5/1970  Germany.

*Primary Examiner*—Marion E. McCamish
*Assistant Examiner*—Blaine R. Copenheaver
*Attorney, Agent, or Firm*—Cushman Darby & Cushman, IP Group of Pillsbury Madison & Sutro LLP

[57] ABSTRACT

An apparatus 1 for widening a foam sheet S obtained immediately after heating and foaming a foam sheet which has not been yet widened, while the foam sheet S is continuously received or supplied. The sheet widening apparatus 1 comprises: a pair of chains 2 constructed in the form of endless chains composed of links 22 having pin parts 21 and a driving device 3 meshing with these chains 2 and driving the chains 2 along such loci as to widen the space between the chains 2 from sheet receiving start points to sheet receving end points. A method for widening a foam sheet by the sheet widening apparatus 1 comprises the steps of piercing both the side parts of the foam sheet S with the pins 21 at the sheet receiving start points; widening the space of width between the pins 21 along gently curved loci by drying the chains 2 while the pins 21 penetrating the foam sheet; and receiving the foam sheet S from the sheet receiving start points to the sheet receiving end points while the foam sheet is widened. The foam sheet S obtained after the widening step in accordance with the sheet widening method.

5 Claims, 10 Drawing Sheets

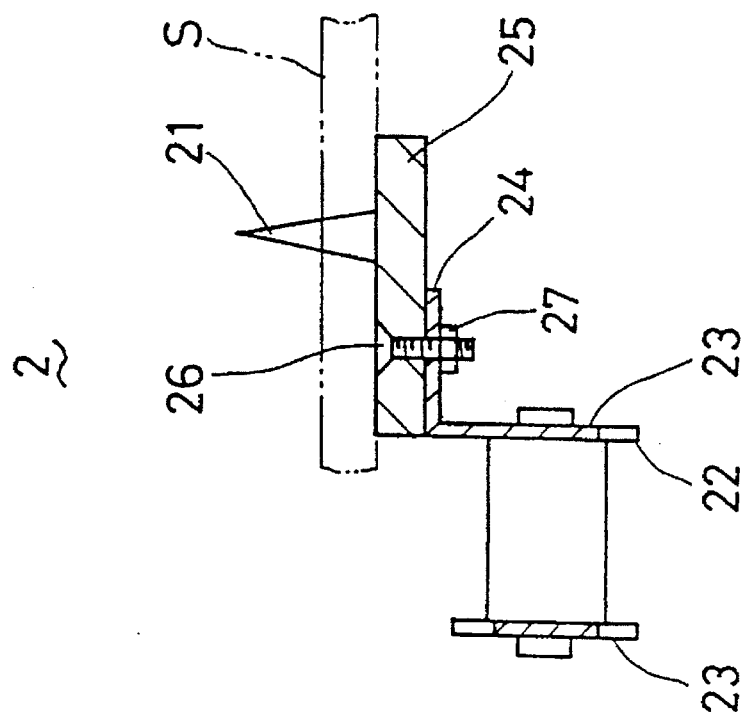
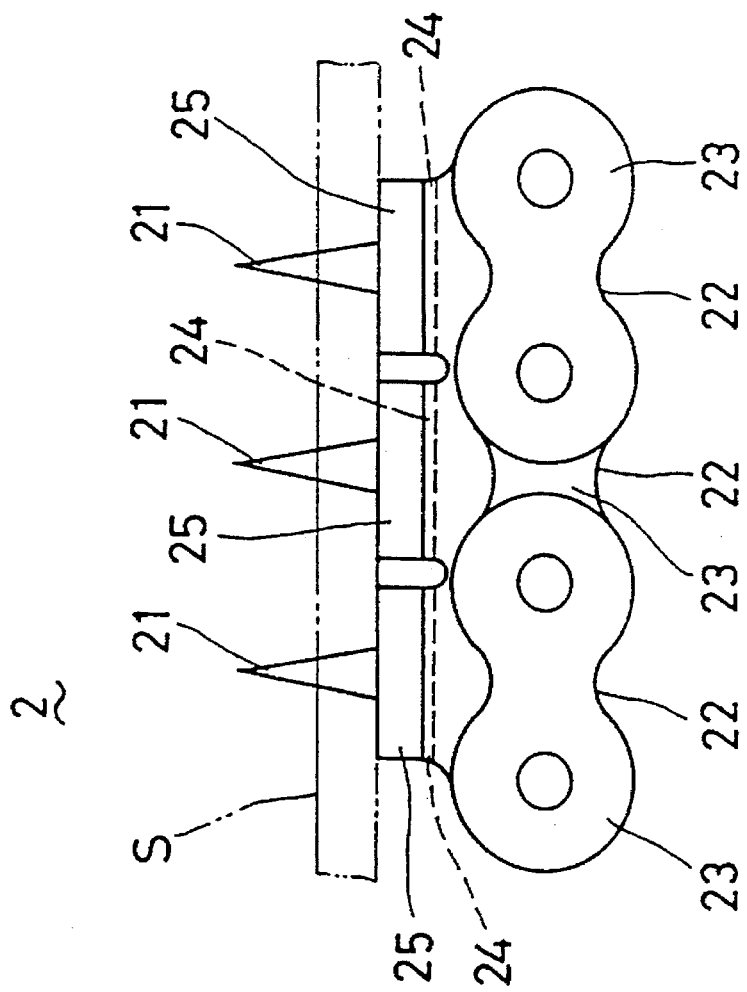
FIG. 4(a)
FIG. 4(b)

FOAM SHEET, METHOD AND APPARATUS FOR WIDENING FOAM SHEET

This is a continuation of application Ser. No. 08/197,971, filed on Feb. 8, 1994, which is abandoned.

BACKGROUND OF THE INVENTION

The present invention relates to a foam sheet obtained by widening a foam sheet foamed by heating and a method and an apparatus for widening a foam sheet.

Generally, in case where a foam sheet is heated and softened to form mold goods, the mold goods have been sometimes wrinkled in accordance with the slackening phenomenon (draw-down) of the foam sheet caused by the self-weight of the foam sheet, or the thickness of the foam sheet has not been uniform, so that the commercial value of the mold goods is deteriorated.

Thus, in order to obtain a foam sheet in which a draw-down phenomenon thereof at the time of thermally forming it, a technique has been conventionally known that a foam sheet obtained immediately after a foam sheet is foamed by heating in the manufacturing step thereof is widened.

As a method for widening a foam sheet obtained immediately after foaming a foam sheet which has not been yet widened, a sheet widening technique such as a technique using a belt-rotary type or disk rotary-type sheet widening apparatus has been known which is vacuum-attached to both the ends of a foam sheet to increase the width of the foam sheet (For example, refer to, Japanese Examined Patent Publication No. 48-9955).

As an alternative method for widening a foam sheet, a sheet widening method using a sheet widening apparatus has been known which is adapted to increase the width of the foam sheet while both the ends of the foam sheet are held by holding parts including a pair of rotary belt like supporters and a plurality of holding wheels for holding both the end parts of the foam sheet (For example, refer to Japanese Unexamined Patent Publication No. 2-72938).

However, the above mentioned conventional sheet widening techniques are methods for increasing the width of a foam sheet merely by a vacuum force or a holding power, and therefore, the foam sheet cannot be always held completely. Thus, a problem that the foam sheet is slipped or displaced upon widening or the foam sheet cannot be widened with a sufficient holding power is liable to arise.

Therefore, the foam sheet to be widened in accordance with these techniques can be widened only within the range of the holding power of the holding parts, so that a completely widened foam sheet cannot be obtained.

In the case of the sheet widening apparatus using the vacuum-attaching means, such a disadvantage arises that the apparatus is complicated or becomes large in size in order to obtain a satisfactory vacuum force.

Further, also in the case of the sheet widening apparatus using the holding parts for holding a foam sheet, a problem resides in that a mechanism becomes complicated due to the rotary belt like supporters or the plurality of holding wheels and the size of the apparatus is large. Particularly, in the case of the sheet widening technique using the holding parts, when the foam sheet is abruptly widened, the foam sheet cannot be held, and therefore, the foam sheet has been gradually widened along gently tapered loci over a long sheet receiving distance. In this case, however, only both the side parts of the foam sheet, namely, only the parts of the foam sheet held by the holding parts are liable to be widened and the foam sheet which is evenly widened all over the direction of width cannot be obtained. In addition, if the foam sheet is widened over the long sheet receiving distance, the foam sheet is cooled on the way of sheet receiving, so that it is necessary to prepare a special heat source for reheating the foam sheet and a temperature adjustment is difficult.

SUMMARY OF THE INVENTION

The present invention has been made in order to overcome these problems. Accordingly, it is an object of the present invention to provide a foam sheet the width of which is completely and uniformly increased in the direction of width, and a sheet widening method and a sheet widening apparatus for simply and easily manufacturing the foam sheet.

For solving the above mentioned problems, a foam sheet of the present invention is a kind of foam sheet widened while it is moved with both the ends thereof fixed by a sheet widening apparatus. This foam sheet is obtained in such a manner that a crosslinked polyolefine foam sheet obtained immediately after a foam sheet which has not been yet widened is foamed by heating is widened along gently curved loci having inflection points.

A sheet widening method according to the present invention for solving the above mentioned problems comprising the steps of: piercing with pins both the side parts of a crosslinked polyolefine foam sheet obtained immediately after a foam sheet which has not been yet widened is foamed by heating when the polyolefine foam sheet is received by a sheet widening apparatus; and widening the space of width between the pins piercing the foam sheet along gently curved loci, while the foam sheet is received from a sheet receiving start point to a sheet receiving end point with the pins penetrating the foam sheet.

Further, a sheet widening apparatus according to the present invention for solving the above mentioned problems comprising: a pair of chains constructed in an endless chain form composed of links having pins and driving means meshing with these chains and driving the chains along such loci as to widen the space between these chains.

Still further, for solving the above described problems, a foam sheet widening apparatus of the present invention as described in claim 3 is characterized in that the driving means meshing with the pair of chains and provided in the sheet receiving start points or the sheet receiving end points are so attached as to be angled relative to the advancing direction of the foam sheet or the inclination angle thereof can be changed.

Still further, for solving the above described problems, a foam sheet widening apparatus of the present invention as described in claim 4 is characterized in that the pins piercing the both side parts of the foam sheet are so attached as to be inclined relative to the links forming the chains.

Furthermore, for solving the above mentioned problems, a foam sheet widening apparatus of the present invention as described in claim 4 is characterized in that the pins piercing the side parts of the foam sheet have larger core angle than the inclination angle of the chains relative to the advancing direction of the foam sheet.

According to the sheet widening method of the present invention, the space of width between the pins is widened while both the side parts of the foam sheet are pierced with the pins, and therefore, this means that the foam sheet is substantially widened by the width between the pins which is increased. The space of width between the pins is widened along gently curved loci having inflection points, so that even if the space of width of the pins is abruptly widened, the side end parts of the foam sheet is not broken or do not get out of place. Therefore, a drawing force is uniformly applied all over the foam sheet.

Further, according to the sheet widening apparatus of the present invention, the pin parts of the chains pierce both the side parts of the foam sheet at the sheet receiving start points, so that they hold both the side parts of the foam sheet. The driving means drive the chains having the pins piercing the foam sheet so that the foam sheet is widened from the receiving start point to the receiving end point of the foam sheet.

Still further, according to the sheet widening apparatus of the present invention, the driving means engaging with a pair of chains at the sheet receiving start point are so attached as to be angled relative to the advancing direction of the foam sheet, or the inclination angle of the driving means can be changed. Therefore, the initial widening step of the foam sheet can be carried out depending on the characteristics of the foam sheet.

Also, since the driving means provided at the sheet receiving start point and the driving means provided at the sheet receiving end point are so attached as to be angled relative to the advancing direction of the foam sheet or the inclination angle of the driving means can be varied, the inclination angle of the driving means can be changed based on the characteristics of the foam sheet, a space between the driving means at the sheet receiving start point and the driving means at the sheet receiving end point can be decreased, which contributes to a small size of apparatus.

Still further, according to the sheet widening apparatus of the present invention, the pins piercing the side parts of the foam sheet are so attached as to be respectively inclined relative to the links forming the chains. Therefore even when the advancing direction of the chains is different from that of the foam sheet, the pins can be directed to the same direction as the advancing direction of the foam sheet at the time of pulling the pins out of the foam sheet. Thus, the pins can be easily pulled out of the foam sheet and such inconveniences, can be prevented, as the winding of the foam sheet on the chains or the breakage of the foam sheet due to the difficulty in pulling the pins out of the foam sheet or the like.

Furthemore, according to the sheet widening apparatus of the present invention, since the pins piercing the side parts of the foam sheet respectively have a larger cone angle than the inclination angle of the chains relative to the advancing direction of the foam sheet, the inclination of the pins relative to the advancing direction of the foam sheet is absorbed because of this large cone angle. Therefore, the pins can be readily pulled out of the foam sheet and various troubles, for example, the twining of the foam sheet on the chains or tearing of the sheet due to the difficulty to pull the pins out of the foam sheet can be prevented.

BRIEF DESCRIPTION OF THE DRAWINGS

Other feature and advantages of the present invention will be apparent from the following description taken in connection with the accompanying drawings, in which

FIG. 4 shows a partial side view and a sectional view illustrating another example of a chain;

DETAILED DESCRIPTION OF THE PREFERRED EMBODIMENT

Now, an embodiment of the present invention will be described hereinbelow with reference to the accompanying drawings.

Figure 1:
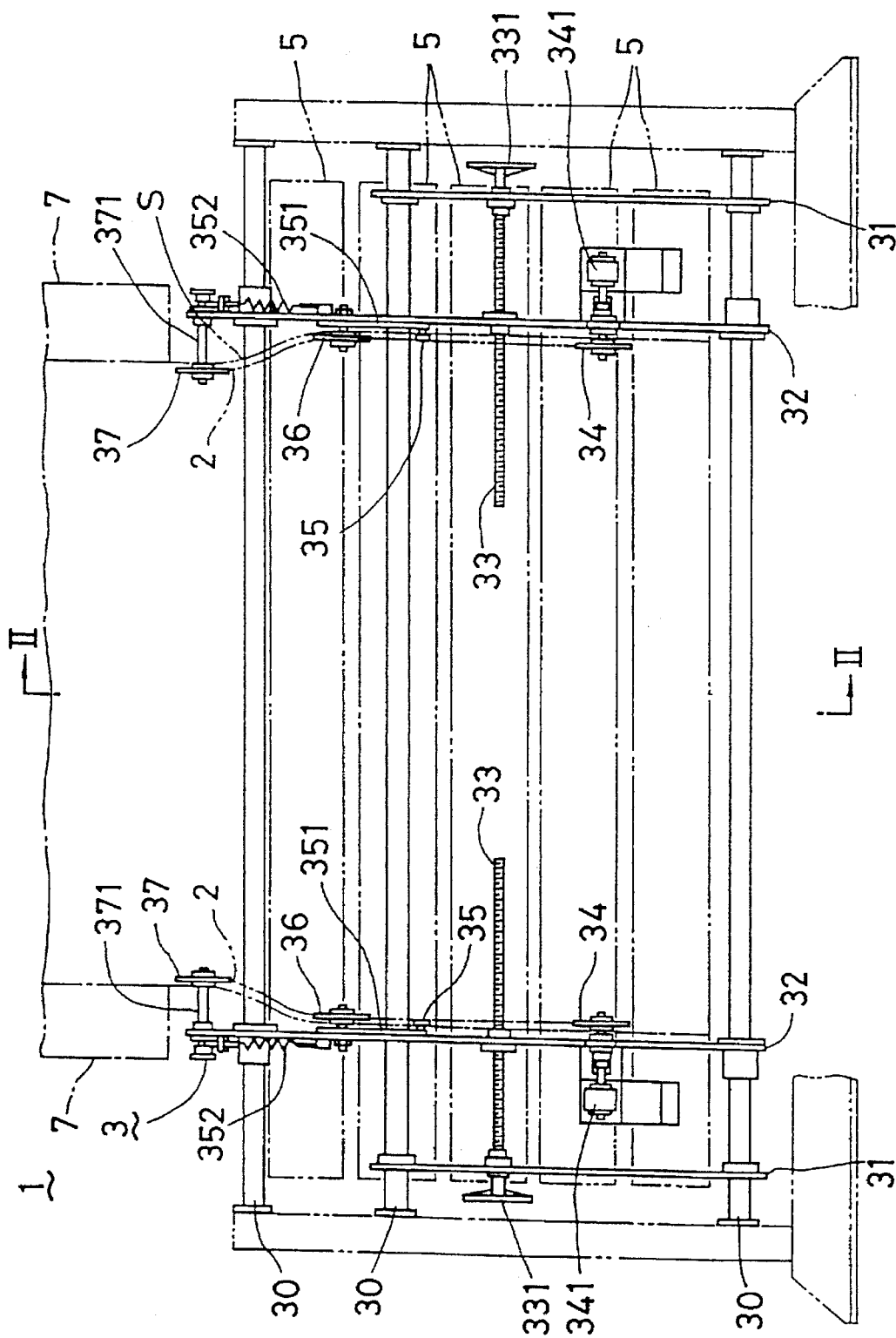
FIG. 1 is a schematic front view showing the entire construction of an apparatus for widening a foam sheet.
Figure 2:
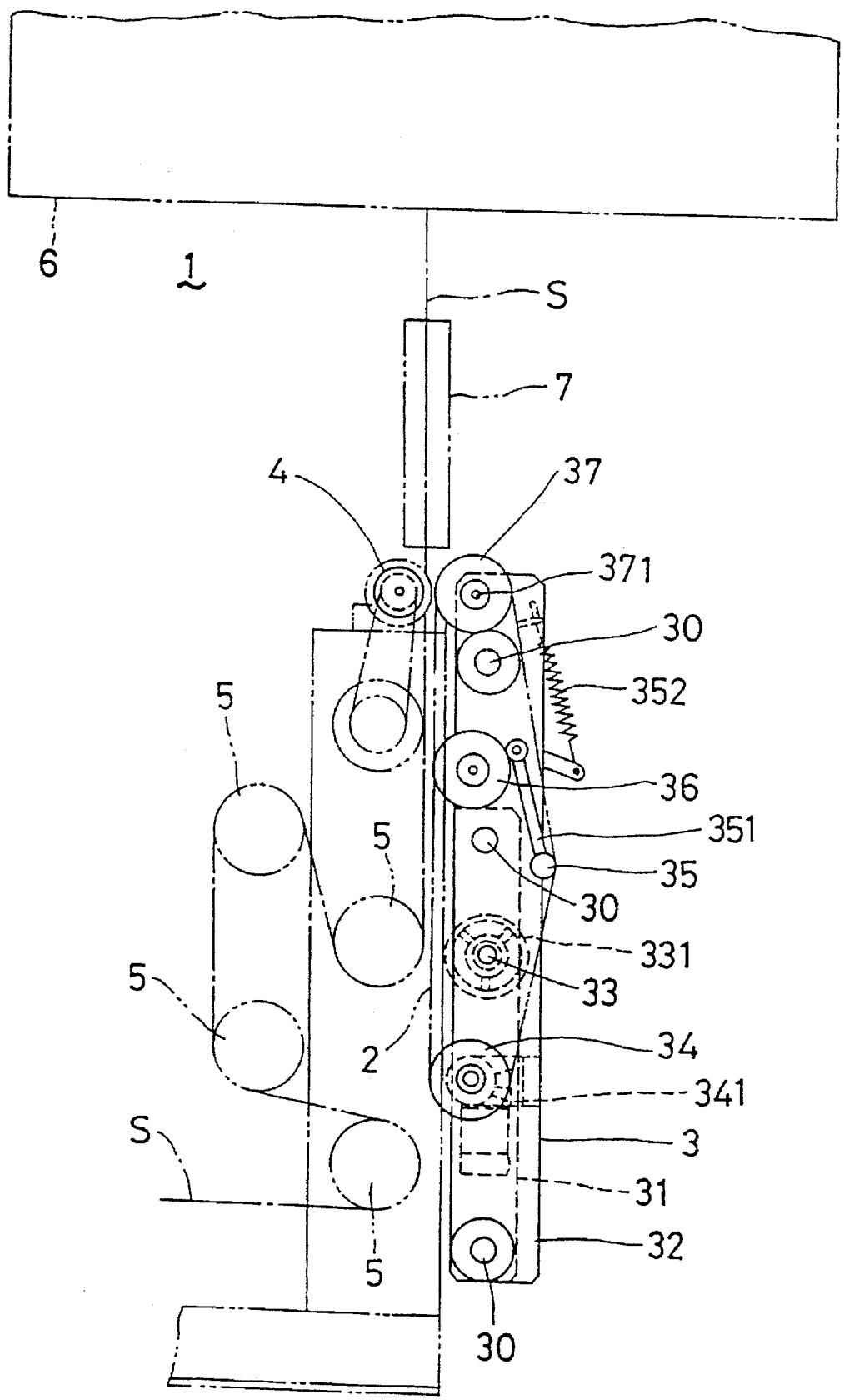
FIG. 2 is a longitudinally sectional view taken along a line II—II in FIG. 1.

FIGS. 1 and 2 schematically illustrate the entire construction of an apparatus 1 for widening a foam sheet S.

This sheet widening apparatus 1 is designed to continuously widen the foam sheet S obtained immediately after a foam sheet which has not been yet widened is foamed by heating while the foam sheet S is continuously received. The sheet widening apparatus includes chains 2 and a driving device 3 for driving the chains along such loci as to widen a space between the chains from sheet receiving start points to sheet receiving end points.

Figure 3B:
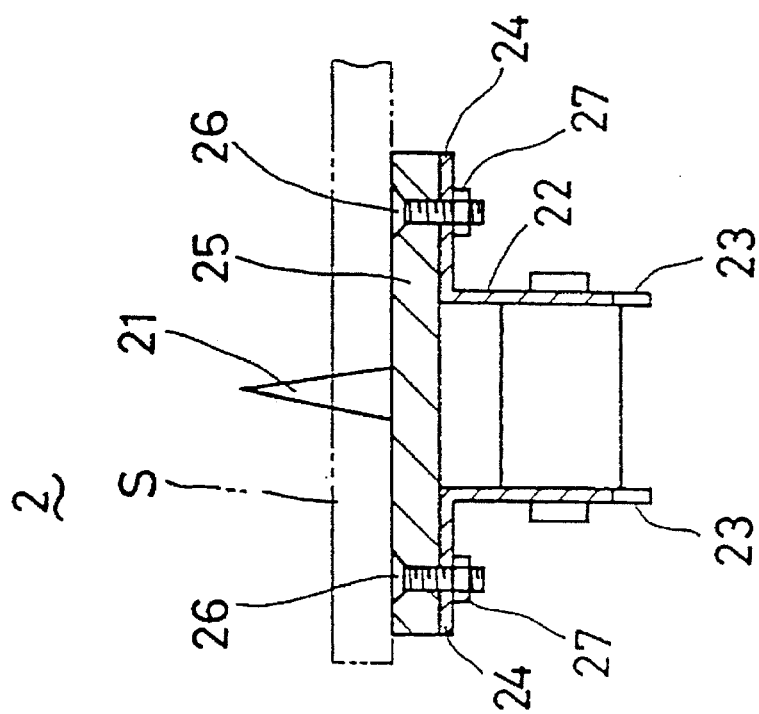
FIG. 3 shows a partial side view and a sectional view schematically illustrating the entire construction of a chain.
Figure 3A:
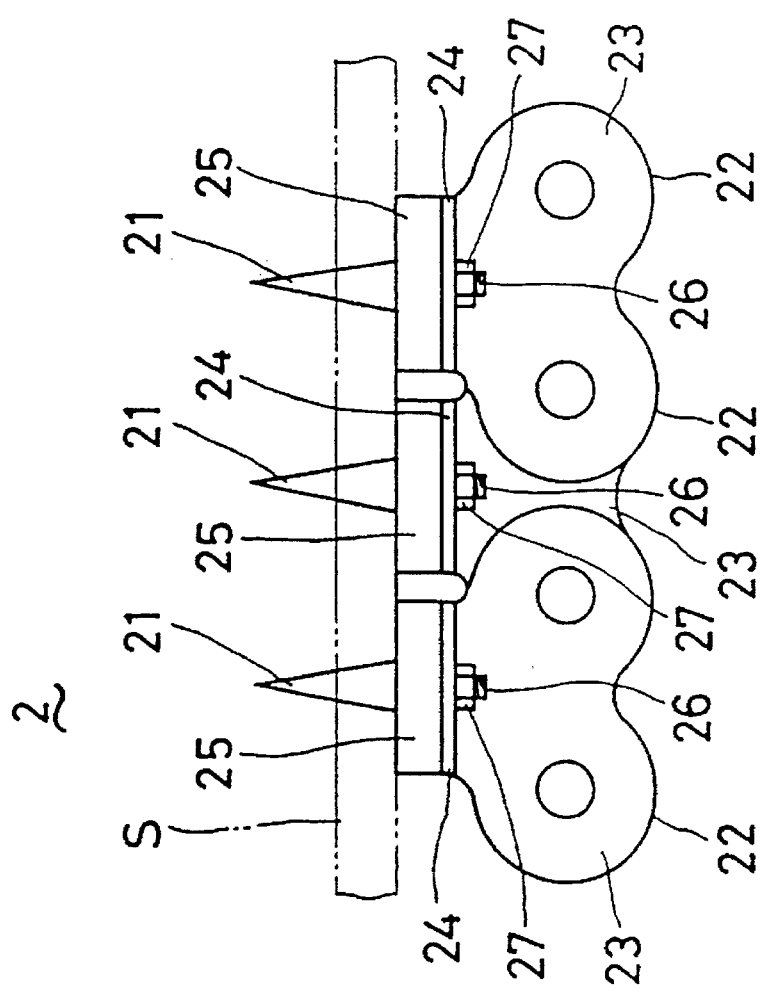

As shown in FIG. 3, each of the chains is constructed in a form of an endless chain by connecting links 22 having pins 21. Receiving parts 24 are extended from link plates 23 of the link 22. To the receiving parts 24, a base member 25 with a pin 21 is fixed by means of bolts 26 and nuts 27. While the links 22 are connected in the form of an endless chain, the pins 21 protrude to the outer surface side of the chain 2. While, in this embodiment, the receiving parts 24 are extended so that the two link plates 23 are connected, the receiving part 24 may be extended only from one link plate 23 and the pin 21 may be projected on the receiving part 24, as shown in FIG. 4. The pin 21 may be so attached as to be vertically inclined.

The driving device 3 includes a pair of substrates 31 so fixed as to be opposed to each other at both end parts of a slide rail 30. In the inside of the fixed substrates 31, a pair of slide substrates 32 are provided so as to be opposite to each other. The fixed substrates 31 are connected to the slide substrates 32 respectively by means of bolts 33 having handles 331. Each of the slide substrates 32 can be slid by rotating each of the handles 331. Namely, the width between the slide substrates 32 can be adjusted in accordance with the width of the foam sheet S by sliding the slide substrates 32.

In the inside of each of the slide substrate 32, there are provided a drive gear 34, a tension gear 35, an outer gear 36 and an inner gear 37 which engage with the chain. The drive gear 34 is rotated by a motor 341 attached to the slide substrate 32 to thereby drive the chain 2. The tension gear 35 is provided on the slide substrate 32 through a crank 351. Then, the tension of the chain 2 is adjusted by virtue of the resilient force of a spring 352 provided in the crank 351. The outer gear 36 is juxtaposed with the drive gear 34 and the tension gear 35. Only the inner gear 37 is disposed at a position inside of these gears 34, 35 and 36. Accordingly, the chain 2 is adapted to be driven and rotated by the drive gear 34 while it passes a gently curved locus having an inflection point from the inner gear 37 to the outer gear 36. The curvature of the curved locus can be changed by adjusting the length of the shaft 371 of the inner gear 37.

In the sheet widening apparatus 1 constructed as mentioned above, the inner gears 37 of the sheet widening apparatus 1 are disposed at the receiving start point side of the foam sheet S to be supplied from a foaming furnace 6.

Next, a method for widening the foam sheet S using the sheet widening apparatus 1 will be described in the following.

Initially, before a sheet widening operation by the sheet widening apparatus 1, the foam sheet S is manufactured.

The foam sheet S is manufactured in such a manner that a thermal decomposition type foaming agent is blended in a polyolefine resin, and an antioxidant, a crosslinking assistant, a pigment or the like are also blended therein, if necessary. The bended product is molten and kneaded at a temperature lower than a temperature at which the foaming agent is decomposed and the molten and kneaded product is formed in a configuration of a sheet by an extruder (a uniaxial extruder, a biaxial extruder, a pressure kneader, etc.) or the like.

Then, the sheet thus extruded is irradiated with an ionizing radiation such as $\alpha$-ray, $\beta$-ray, $\gamma$-ray, electron beam, etc, and crosslinked. As methods for this crosslinking technique may adopt such methods as a chemical crosslinking method using an organic peroxide, a method for grafting or copolymerizing vinyl trimethoxysilane or the like with a resin and closslinking the grafted or copolymerized material with water and the like may be employed.

The foam sheet S crosslinked as mentioned above is heated at a decomposition temperature or higher of the foaming agent in a foaming furnace 6 and foamed. Various foaming techniques such as methods for passing the foam sheet through a preheating area and a foaming area in a foaming furnace using a hot air circulating type vertical foaming furnace or horizontal foaming furnace have been known (As for a foaming apparatus, refer to Japanese Examined Patent Publication Nos. 42-18832 and 48-9955).

The foam sheet S thus obtained immediately after a foam sheet before it is widened is foamed by heating in the foaming furnace 6 undergoes a first widening step by a vacuum device 7 or the like using vacuum adsorption means. Then, the foam sheet S is supplied to the sheet widening apparatus 1. The first widening step involves a step for stretching flares (vertical wrinkles) of the foam sheet S immediately after being subjected to heating and foaming processes, so that any kind of widening technique may be employed or it may be omitted.

In the sheet widening apparatus 1, then, both the side parts of the foam sheet S are pierced with the pins 21 of the chains 2 at the positions of the inner gears 37 in the sheet receiving start point side. At this time, in the back surface of the foam sheet S, brush wheels 4 are disposed and are adapted to support the piercing operations of the pins 21. The pins 21 may pierce the foam sheet S so as to pass through the foam sheet S or to penetrate the foam sheet up to the middle of the sheet. The foam sheet S may or may not be pierced with the pins 21 up to their roots.

The foam sheet S pierced with the pins 21 are received by a plurality of sheet receiving rolls 5. At the same time, since the chains 2 pass and drive the foam sheet along such tracks as to increase the width between the chains 2 from the inner gears 37 to the outer gears 36, the foam sheet S is widened along the tracks of the chains 2.

In this case, the foam sheet is pierced with the pins 21 so that it is not shifted or displaced in the direction of its width, and therefore, the foam sheet S is substantially widened by the width increased along the tracks of the chains 2.

Further, since the widening force of the foam sheet S is distributed over the side parts thereof by piercing them with a number of pins 21, the foam sheet S is effectively prevented from being broken.

The loci or tracks of the chains 2 are gently curved having the inflection points from the inner gears 37 to the outer gears 36, and therefore, the foam sheet S can be entirely evenly widened while it passes from the inner gears 37 to the outer gears 36.

Figure 5:
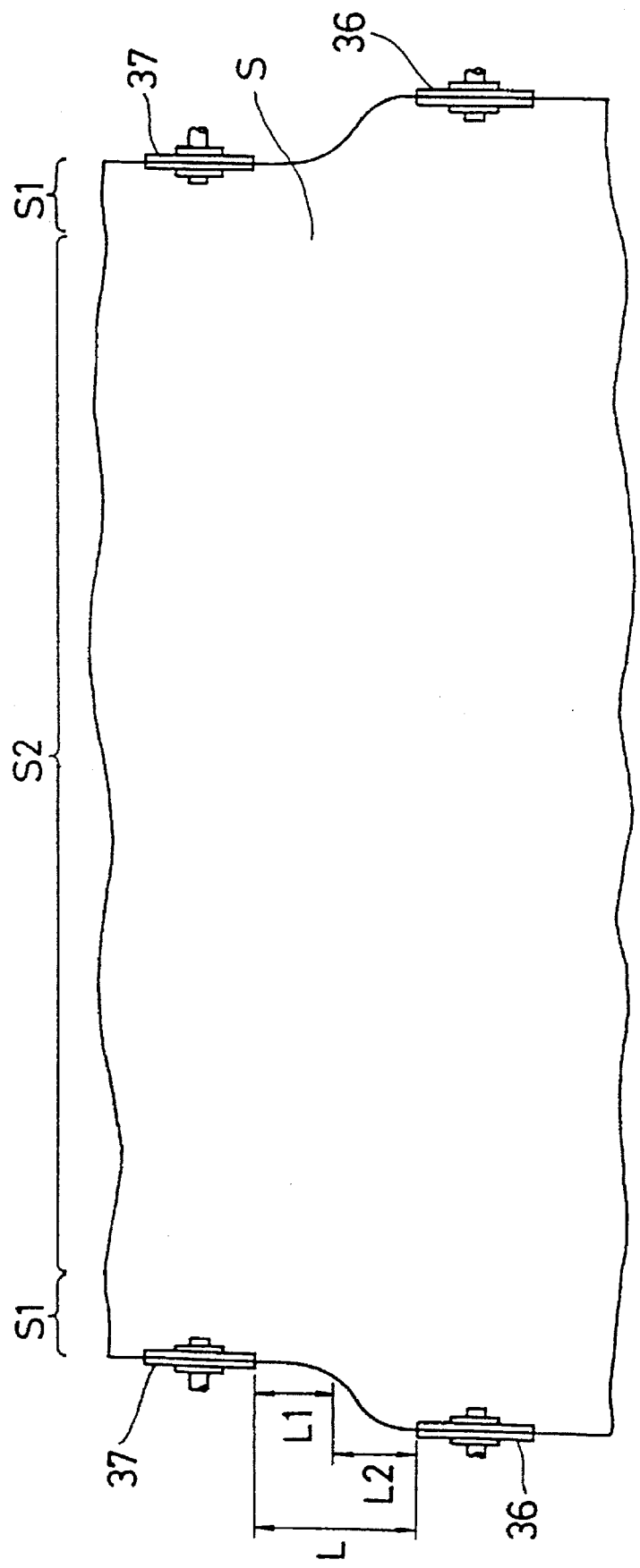
FIG. 5 is a schematic view for explaining a sheet widening method according to the present invention.

Namely, as shown in FIG. 5, the foam sheet S is first gradually widened in parts L1 of the loci after passing the inner gears 37 curvature of which is loose. In this widening step of sheet, both the side parts S1 of the foam sheet S are mainly stretched. Both the side parts S1 are stretched, so that the tensile strength of the side parts S1 can be improved.

As the foam sheet S advances toward the outer gears 36, the foam sheet S is abruptly widened at the parts L2, a curvature of which is sharp, on the loci or tracks of the chains 2. As a result of this widening operation, the central part S2 of the foam sheet S is mainly stretched. Since the tensile strength of both the side parts S1 of the foam sheet S has been already improved at the time of the first widening step, the foam sheet S is not broken and can bear such an abrupt widening operation. Further, since the foam sheet is widened along generally curved loci, the sheet can be immediately widened without locally applying an unreasonable force thereto. Distance L between each of the inner gears 37 and each of the outer gears 36 which is required for widening the foam sheet can be reduced as shown in FIG. 5. While the foam sheet S has remaining heat after the foam sheet S is delivered from the foaming furnace 6, the foam sheet S can be effectively widened without providing an additional heating source The widened foam sheet S includes both the side parts S1 and the central part S2 which are entirely uniformly widened.

In the above described apparatus for widening the foam sheet according to the present invention, while an example has been mentioned in which the inner gears meshing with a pair of chains and operating as the driving means at the sheet receiving start points and the inner gears as the driving means at the sheet receiving end points are provided in parallel to the advancing direction of the sheet, the driving means at the sheet receiving start points or the driving means at the sheet receiving end points may be so attached as to be angled relative to the advancing direction of the sheet or the inclination angle of the driving means may be changed, an example of which will be described hereinbelow.

Figure 6:
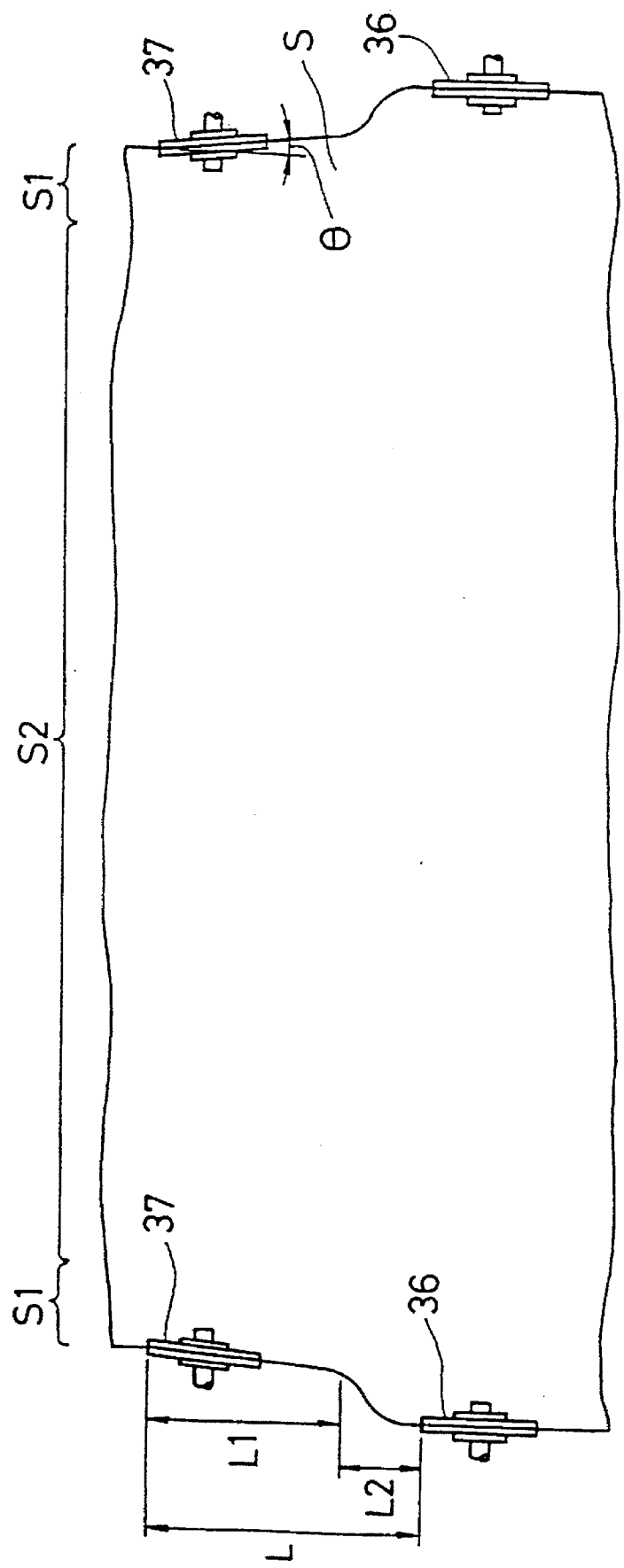
FIG. 6 is a schematic view for explaining another sheet widening method according to the present invention.

As shown in FIG. 6, when the inner gears 37 as the driving means at the sheet receiving start points are so attached beforehand as to be angled 8 and tapered relative to the advancing direction of the sheet S, the parts L1 of gentle curvature of the loci of the sheet S are lengthened, so that the initial widening operation of the sheet S after passing the inner gears 37 can be completely carried out. If the angle 8 is changed, an initial widening step suitable for the sheet S can be achieved.

Figure 7:
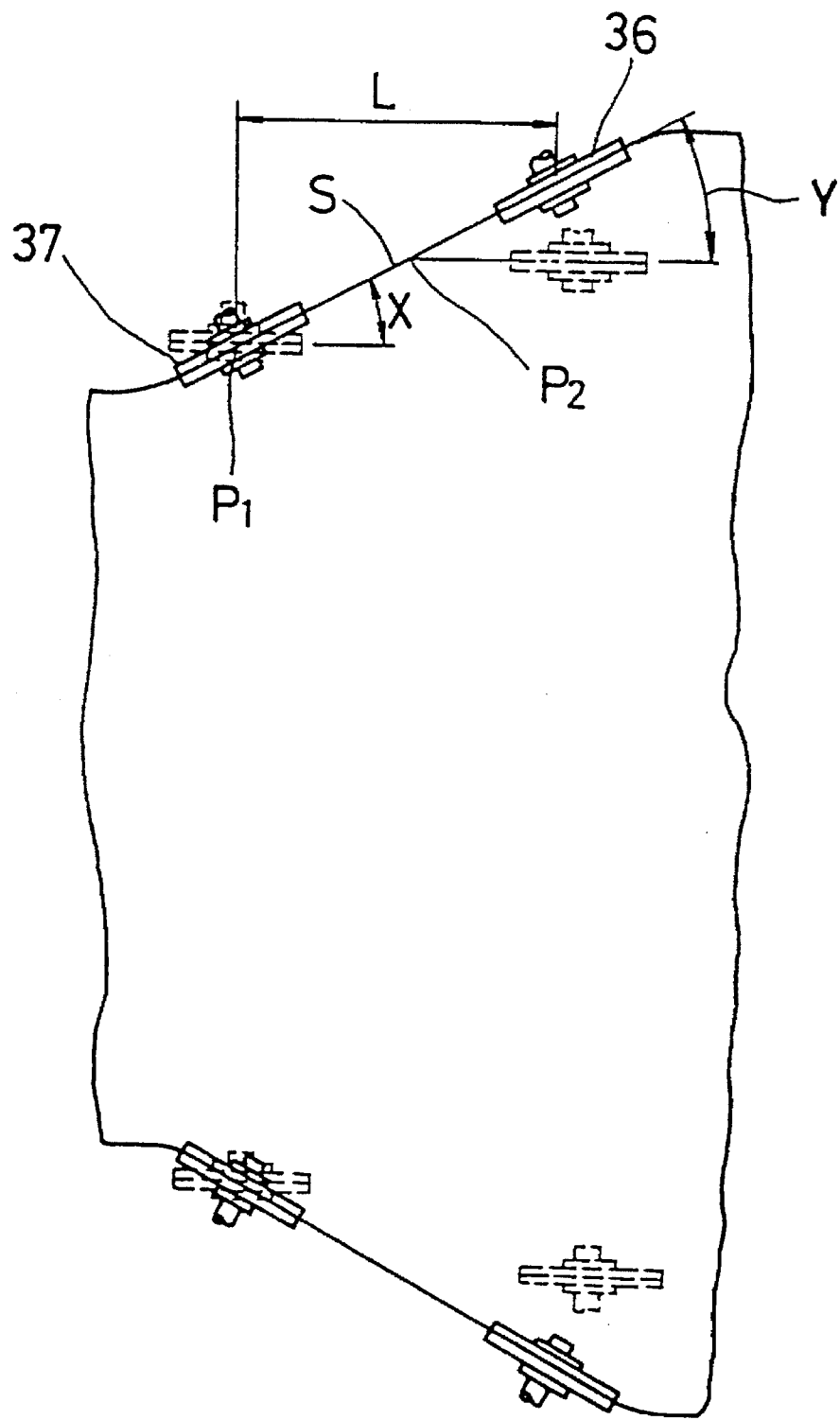
FIG. 7 is a schematic view for explaining still another sheet widening method according to the present invention.

As shown in FIG. 7, if each of the inner gears 37 as the driving means at the sheet receiving star points can be rotated about a supporting point $P_1$ in the direction shown by an arrow X and each of the outer gears 36 as the driving means at the sheet receiving end points can be rotated about a supporting point $P_2$ in the direction shown by an arrow Y, and the inclination angle of the inner gears 37 and the outer gears 36 can be varied relative to the advancing direction of the sheet S, the space L between each of the inner gears 37 and each of the outer gears 36 can be more reduced than in the case of the similarly widened foam sheet S, which contributes for the formation of small size of apparatus.

Figure 8:
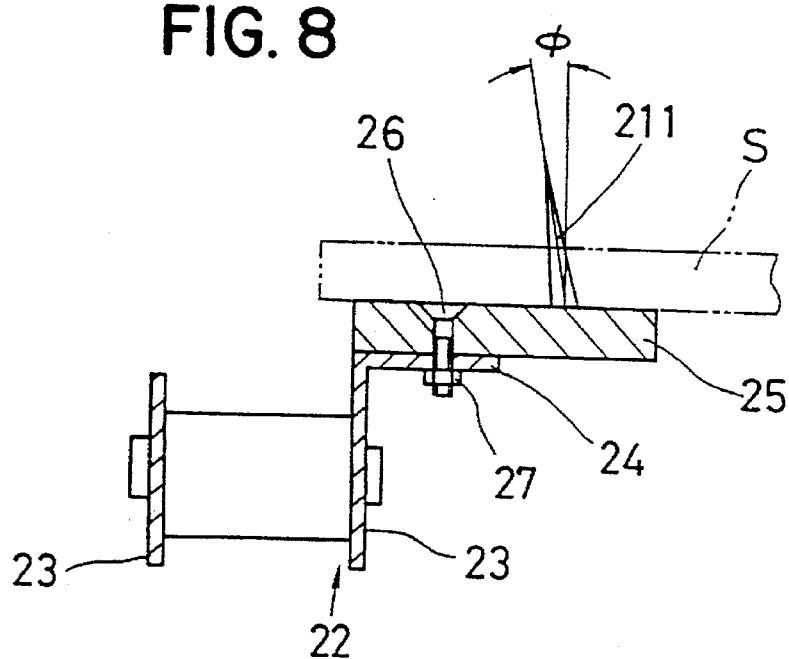
FIG. 8 is a sectional view showing still another example of a chain of the sheet widening apparatus according to the present invention.

FIG. 8 shows a sectional view showing another example of the chain of the sheet widening apparatus according to the present invention.

In FIG. 8, reference numeral 211 designates a pin inclined and attached to a base member 25 which is fixed to a receiving part 24 by means of a bolt 26 and a nut 27. The receiving part 24 is extended from a link plate 23 of a link 22 of a chain 2. $\phi$ is an inclination angle of the pin 211 so attached as to be inclined to the base member 25 of the link 22 relative to the link 22.

Figure 9:
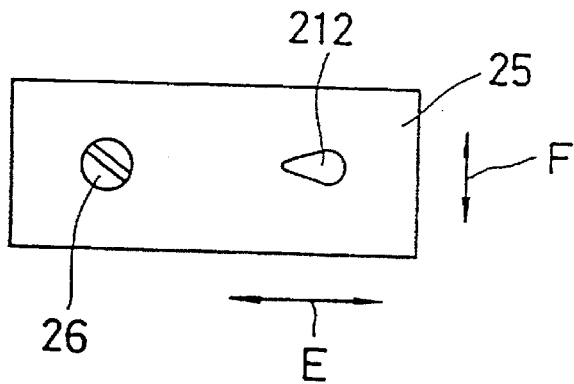
FIG. 9 is a plane view showing an example of the attaching direction of a pin part of the sheet widening apparatus according to the present invention.
Figure 10:
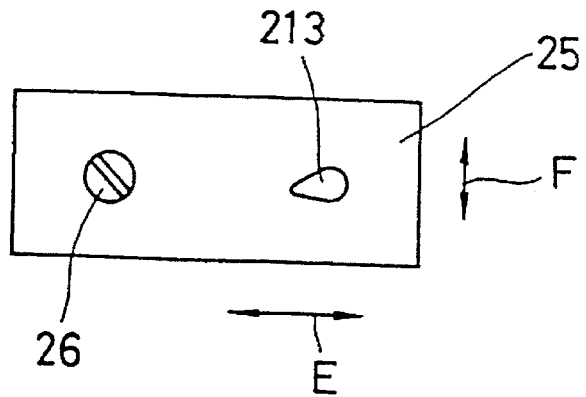
FIG. 10 is a plane view showing another example of the attaching direction of a pin part of the sheet widening apparatus according to the present invention.

FIGS. 9 and 10 show the attaching direction of a pin part inclined and attached to the base member 25. FIG. 9 is a plan view showing an example of a pin horizontally inclined and attached to the base member and viewed from the side in which the pin is provided. FIG. 10 is a plan view showing an example of a pin horizontally and vertically inclined and attached to the base member and viewed from the side in which the pin is provided.

In FIG. 9, reference numeral 212 designates a pin part horizontally (direction shown by an arrow E) inclined and attached to the base member. The pin part 212 is horizontally inclined and attached relative to the base member 25.

In FIG. 10, reference numeral 213 denotes a pin part horizontally (direction shown by an arrow E) and vertically (direction shown by an arrow F) inclined and attached to the base member. The pin part 213 is so attached as to be inclined horizontally and vertically relative to the base member 25.

Figure 11:
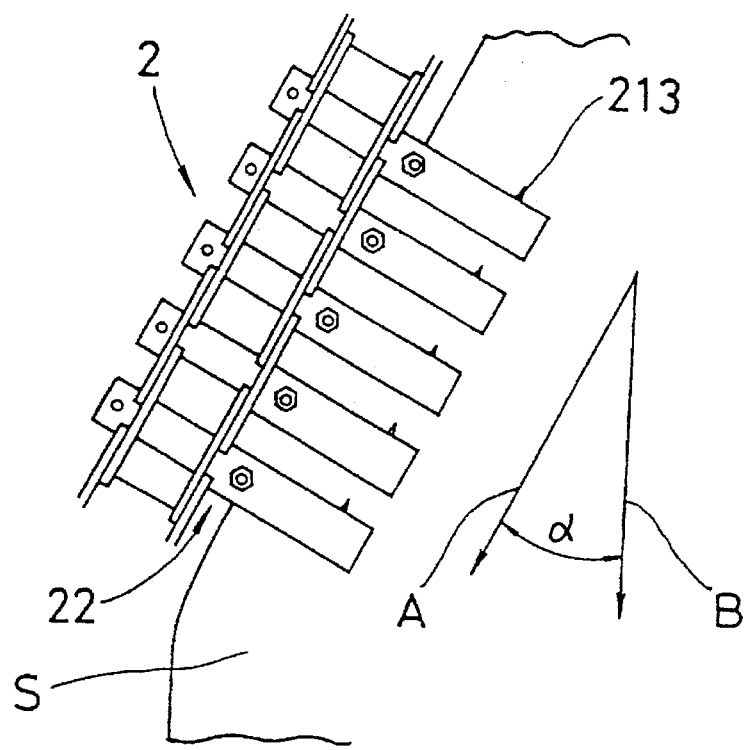
FIG. 11 is a schematic view for explaining the state of the chain shown in FIG. 8 when the space between the chains is widened.

In this way, in case where the pins 213 are so attached as to be inclined to the links 22, as shown in FIG. 11, when the pins 213 are to be pulled out of the foam sheet S, the pins 213 are directed to the same direction as the advancing direction (direction shown by an arrow B) of the foam sheet S and the pins 213 can be easily slipped from the foam sheet S, even if the adavancing direction (direction shown by an arrow A) of the chain 2 is different from the advancing direction (shown by the arrow B) of the foam sheet S. $\alpha$ is an angle between the advancing direction of the chain 2 and the advancing direction of the foam sheet S. The above mentioned inclination angle $\phi$ corresponds to this angle $\alpha$.

Figure 12:
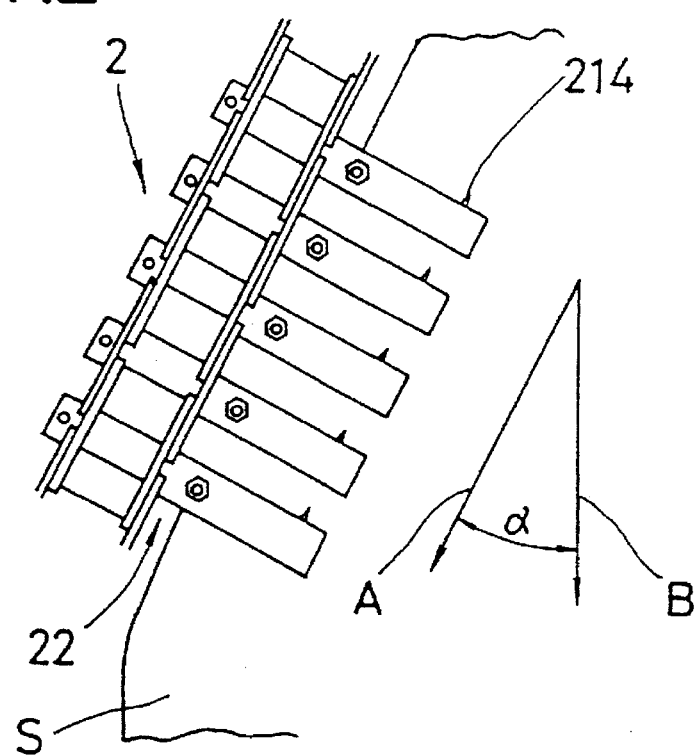
FIG. 12 is a schematic view for explaining the state of a chain when widening the space between the chains without using the chain shown in FIG. 8.

In case where the pins 213 are not so attached as to be inclined relative to the links 22, as shown in FIG. 12, the pins 214 are inclined by an angle equal to the angle $\alpha$ between the advancing direction (direction shown by an arrow A) of the chain 2 and the advancing direction (direction shown by an arrow B) of the foam sheet S, if the advancing direction of the chain 2 is different from the advancing direction of the foam sheet S. Under this state, when the pins 214 are to be pulled out of the foam sheet S, it is difficult to pull the pins 214 out of the foam sheet S. Therefore, such difficulties have been encountered, as the twining of the foam sheet S on the chains, the breakage of the sheet or the like.

Figure 13:
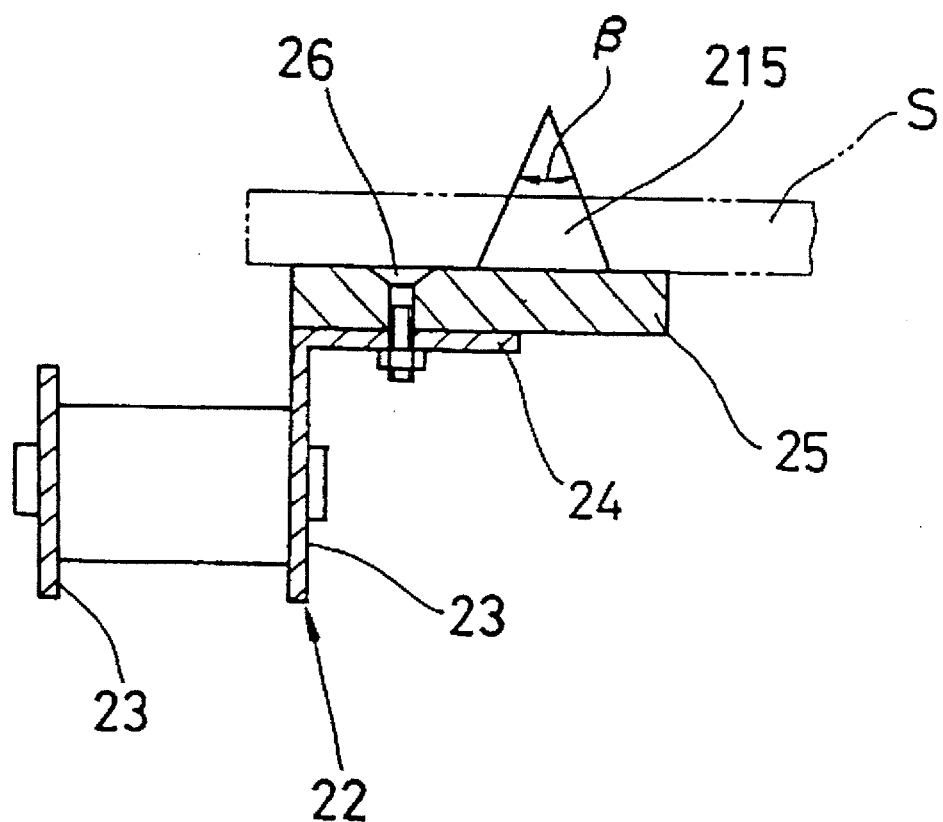
FIG. 13 is a sectional view showing a still further example of a chain of the sheet widening apparatus according to the present invention.

FIG. 13 is a sectional view showing a still another example of a chain of the sheet widening apparatus according to the present invention.

In FIG. 13, reference numeral 215 designates a pin part attached to a base member 25 fixed to a receiving part 24 by means of a bolt 26 and a nut 27. The receiving part 24 is extended from a link plate 23 of a link 22 of a chain 2. $\beta$ is a cone angle of the pin part 213. The cone angle $\beta$ is larger than the angle $\alpha$ between the advancing direction of the chain 2 and the advancing direction of the foam sheet S. The pin part 215 is so formed as to have a thick root and a thin end.

In such a construction, when the pins 215 are to be pulled out of the foam sheet S, even if the advancing direction of the chains 2 is different from the advancing direction of the foam sheet S, the inclination of the pins 215 relative to the advancing direction of the foam sheet S is absorbed and therefore, the pins 215 can be easily slipped from the foam sheet S because the pins 215 respectively have a large cone angle.

As mentioned before, according to the present invention, a foam sheet is not broken and completely, entirely and uniformaly stretched by widening the foam sheet along the gently curved loci having the inflection points, so that the foam sheet excellent in workability and having no drawing-down can be obtained.

According to the sheet widening method according to the present invention, the foam sheet is not shifted or displaced in the direction of width thereof by piercing both the side parts of the foam sheet with the pins and the foam sheet can be substantially widened by the space of width between the pins increased. Therefore, the foam sheet can be strongly widened by widening the space of width between the pins along the gently curved loci having the inflection points while the pins pierce both the sides of the foam sheet, and the sufficiently widened foam sheet can be obtained.

Further, according to the sheet widening apparatus of the present invention, while the foam sheet is pierced with the pins in both the sides thereof at the sheet receiving start points, the foam sheet can be simultaneously widened and supplied to the sheet receiving end points by driving the chains. Therefore, even if the foam sheet is widened abruptly to some degree, the foam sheet can be completely widened without releasing the holding state of both the side parts of the foam sheet. The pins holding both the side parts of the foam sheet move depending on the driving of the chains composed of the links having the pins in question. Thus, even in case where the foam sheet is widened over multistages, it can be simply and readily widened by changing the driving tracks or loci of the chains to desired widening conditions.

Still further, according to the sheet widening apparatus of the present invention, the driving means provided at the sheet receiving start points and meshing with a pair of chains are so attached as to be angled relative to the advancing direction of the foam sheet and the inclination angle of the driving means can be changed, so that the initial widening step of the foam sheet can be achieved in accordance with the characteristics of the foam sheet.

Also, since the driving means at the sheet receiving start points or the driving means at the sheet receiving end points are so attached as to be angled and inclined relative to the advancing direction of the foam sheet, or the inclination angle of the driving means may be changed, the inclination angle can be changed depending on the characteristics of the foam sheet, the space between each of the driving means at the sheet receiving start points and each of the driving means at the sheet receiving end points, that is, a distance required for widening the foam sheet can be reduced, which contributes for manufacture of the small size of apparatus.

Still further, according to the sheet widening apparatus of the present invention, since the pins penetrating both the side parts of the foam sheet are so attached as to be inclined relative to the links forming the chains, the pins can be directed to the same direction as the advancing direction of the foam sheet at the time of pulling the chains out of the foam sheet, even when the advancing direction of the chains is different from that of the foam sheet. Thus, the pins can be smoothly slipped from the foam sheet. Accordingly, such inconveniences can be prevented, as the winding of foam sheet on the chains, the breakage of the sheet or the like due to hard slipping of the pins from the foam sheet.

Furthermore, according to the sheet widening apparatus of the present invention, since the pins penetrating the side parts of the foam sheet respectively have a larger cone angle than the inclination angle of the chains relative to the advancing direction of the foam sheet, the inclination of the pins relative to the advancing direction of the foam sheet is absorbed by virtue of the large cone angle and the pins can be readily slipped from the foam sheet. As a result, various troubles, such as the twining of the foam sheet on the chains, the breakage of sheet or the like because of hard slipping of the pins from the foam sheet, can be prevented.

What is claimed is:

1. A method for widening a foam sheet comprising the steps of:

piercing with pins both outer marginal side edges along the advancing direction of a crosslinked foam sheet obtained immediately after a foam sheet which has not been yet widened is foamed by heating, when said foam sheet is received by a sheet widening apparatus, said pins being attached to chains which travel along gently curved loci; and widening the width of the foam sheet between the pins piercing both side edges of the foam sheet along the gently curved loci while said foam sheet is received from sheet receiving start points to sheet receiving end points with the pins piercing the side edges of the foam sheet such that the sheet is stretched first in an inwardly convexed direction and then in an outwardly convexed direction.

2. The method as set forth in claim 1 including the additional step of initially widening the foam sheet in the area immediately adjacent each side edge.

3. The method as set forth in claim 1 wherein the sheet has portions extending inwardly from each of the side edges and a central portion lying therebetween, said method including the additional steps of initially stretching the side edge portions and thereafter stretching the central portion.

4. The method as set forth in claim 3 wherein the side edge portion stretching occurs along a gradual curvature.

5. The method as set forth in claim 1 including the additional steps of increasing the tensile strength of the marginal side edges of the sheet and thereafter stretching the remaining portion of the foam sheet located between such marginal side edges.

* * * * *